US009909773B2

(12) United States Patent
Sullivan et al.

(10) Patent No.: US 9,909,773 B2
(45) Date of Patent: *Mar. 6, 2018

(54) FAN COIL THERMOSTAT WITH FAN RAMPING

(71) Applicant: Honeywell International Inc., Morris Plains, NJ (US)

(72) Inventors: Daniel J. Sullivan, Saint Anthony, MN (US); Levi H. Geadelmann, Edina, MN (US); Paul Wacker, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,480

(22) Filed: Apr. 19, 2017

(65) Prior Publication Data

US 2017/0219236 A1   Aug. 3, 2017

Related U.S. Application Data

(63) Continuation of application No. 14/740,789, filed on Jun. 16, 2015, now Pat. No. 9,657,959, which is a (Continued)

(51) Int. Cl.
  *F24F 11/053* (2006.01)
  *F24F 11/00* (2018.01)
  (Continued)

(52) U.S. Cl.
  CPC ........ *F24F 11/0012* (2013.01); *F24F 1/0018* (2013.01); *F24F 11/006* (2013.01);
  (Continued)

(58) Field of Classification Search
  CPC .. F24F 1/0007; F24F 11/0012; F24F 11/0079; F24F 11/0076; F25B 2600/112
  (Continued)

(56) References Cited

U.S. PATENT DOCUMENTS 3,653,590 A   4/1972   Elsea
3,653,689 A   4/1972   Sapy et al.
(Continued)

FOREIGN PATENT DOCUMENTS

JP   360152292   8/1985

OTHER PUBLICATIONS

"33ZCFANCOL ComfortiD™ Fan Coil—Fan Coil Zone Controller for Carrier Comfort Network® (CCN) System 1 Carrier Building Solutions." N.p., Feb. 1, 2002. Web. Jun. 30, 2016.
(Continued)

*Primary Examiner* — Jonathan Bradford
(74) *Attorney, Agent, or Firm* — Seager, Tufte & Wickhem, LLP

(57) ABSTRACT

Fan coil thermostats can provide energy savings by, for example, operating a fan coil system more efficiently. Fan coil systems employing such a fan coil thermostat may be more energy efficient. A fan coil system may include a fan coil that is configured for fluid communication with a source of heated fluid and/or a source of cooled fluid, a valve that controls fluid flow through the fan coil and a fan that blows air across the fan coil. The fan coil thermostat may include a controller that implements a control algorithm that calculates an error percentage value relating to a temperature difference between the current temperature and the temperature set point. The error percentage value may include a proportional term related to the temperature difference and an integral term related to the temperature difference. The controller may regulate the fan speed in accordance with the calculated error percentage.

20 Claims, 6 Drawing Sheets

Related U.S. Application Data continuation of application No. 11/833,703, filed on Aug. 3, 2007, now Pat. No. 9,074,784.

(51) Int. Cl.
*F24F 1/00* (2011.01)
*G05B 19/048* (2006.01)

(52) U.S. Cl.
CPC ........ *F24F 11/008* (2013.01); *F24F 11/0079* (2013.01); *F24F 11/0086* (2013.01); *G05B 19/048* (2013.01); *F24F 2011/0064* (2013.01); *F24F 2011/0075* (2013.01); *F24F 2011/0091* (2013.01); *G05B 2219/2614* (2013.01)

(58) Field of Classification Search
USPC ........................................... 62/186; 236/49.3
See application file for complete search history.

(56) References Cited

U.S. PATENT DOCUMENTS

| | | | |
|---|---|---|---|
| 3,674,203 A | 7/1972 | McGrath | |
| 3,684,170 A | 8/1972 | Roof | |
| 3,945,432 A | 3/1976 | Tamblyn | |
| 4,049,044 A | 9/1977 | Cohen | |
| 4,060,123 A | 11/1977 | Hoffman et al. | |
| 4,333,316 A | 6/1982 | Stamp, Jr. et al. | |
| 4,403,646 A | 9/1983 | Fodera | |
| 4,473,107 A | 9/1984 | Fairbrother et al. | |
| 4,485,863 A | 12/1984 | Yoshida et al. | |
| 4,531,454 A | 7/1985 | Spoormaker | |
| 4,639,709 A | 1/1987 | Koets | |
| 4,675,828 A | 6/1987 | Winston | |
| 4,748,822 A | 6/1988 | Erbs et al. | |
| 4,754,607 A | 7/1988 | Mackay | |
| 4,824,013 A | 4/1989 | Gouldey | |
| 4,918,615 A | 4/1990 | Suzuki et al. | |
| 5,024,379 A | 6/1991 | Dempsey | |
| 5,101,639 A | 4/1992 | Wruck et al. | |
| 5,123,592 A | 6/1992 | Desmarais et al. | |
| 5,131,236 A | 7/1992 | Wruck et al. | |
| 5,133,193 A | 7/1992 | Wruck et al. | |
| 5,138,842 A | 8/1992 | Wruck et al. | |
| 5,167,366 A | 12/1992 | Desmarais et al. | |
| 5,170,635 A | 12/1992 | Wruck et al. | |
| 5,172,560 A | 12/1992 | Jurewicz et al. | |
| 5,172,565 A | 12/1992 | Wruck et al. | |
| 5,173,843 A | 12/1992 | Rowlette et al. | |
| 5,183,102 A | 2/1993 | Clark | |
| 5,184,122 A | 2/1993 | Decious et al. | |
| 5,210,477 A | 5/1993 | Rowlette et al. | |
| 5,261,483 A | 11/1993 | Imaoka | |
| 5,281,483 A | 1/1994 | Hwo | |
| 5,303,562 A | 4/1994 | Bahel et al. | |
| 5,305,952 A | 4/1994 | Hannarong | |
| 5,318,224 A | 6/1994 | Darby et al. | |
| 5,397,970 A | 3/1995 | Rowlette et al. | |
| 5,404,934 A | 4/1995 | Carlson et al. | |
| 5,460,221 A | 10/1995 | Stalsberg et al. | |
| 5,476,221 A | 12/1995 | Seymour | |
| 5,492,273 A | 2/1996 | Shah | |
| 5,528,229 A | 6/1996 | Mehta | |
| 5,555,736 A | 9/1996 | Wills et al. | |
| 5,592,058 A | 1/1997 | Archer et al. | |
| 5,592,989 A | 1/1997 | Lynn et al. | |
| 5,682,949 A | 11/1997 | Ratcliffe et al. | |
| 5,718,372 A | 2/1998 | Tishler | |
| 5,727,395 A | 3/1998 | Gou et al. | |
| 5,737,934 A | 4/1998 | Shah | |
| 5,797,273 A | 8/1998 | Guo | |
| 5,797,717 A | 8/1998 | Tanaka et al. | |
| 5,819,840 A | 10/1998 | Wilson et al. | |
| 6,012,296 A | 1/2000 | Shah | |
| 6,102,749 A | 8/2000 | Lynn et al. | |
| 6,119,125 A | 9/2000 | Gloudeman et al. | |
| 6,264,111 B1 * | 7/2001 | Nicolson | F24F 11/006 236/49.3 |
| 6,295,823 B1 | 10/2001 | Odom et al. | |
| 6,308,702 B1 | 10/2001 | Huyghe et al. | |
| 6,318,639 B1 | 11/2001 | Toth | |
| 6,478,233 B1 | 11/2002 | Shah | |
| 6,557,771 B2 | 5/2003 | Shah | |
| 6,716,406 B2 | 4/2004 | Reisfeld et al. | |
| 6,736,328 B1 | 5/2004 | Takusagawa | |
| 6,772,049 B2 | 8/2004 | Choi | |
| 6,851,621 B1 | 2/2005 | Wacker et al. | |
| 7,076,961 B2 | 7/2006 | Takusagawa | |
| 7,106,019 B2 | 9/2006 | Becerra et al. | |
| 7,131,490 B1 | 11/2006 | Roskewich | |
| 7,331,760 B2 | 2/2008 | Furuta | |
| 7,641,126 B2 | 1/2010 | Schultz et al. | |
| 9,074,784 B2 | 7/2015 | Sullivan et al. | |
| 9,182,141 B2 | 11/2015 | Sullivan et al. | |
| 9,657,959 B2 | 5/2017 | Sullivan et al. | |
| 2002/0117986 A1 | 8/2002 | Becerra et al. | |
| 2003/0021720 A1 | 1/2003 | Reisfeld et al. | |
| 2003/0149576 A1 | 8/2003 | Sunyich | |
| 2004/0104278 A1 | 6/2004 | Walsh | |
| 2004/0165986 A1 | 8/2004 | Parker et al. | |
| 2004/0173690 A1 | 9/2004 | Takusagawa | |
| 2005/0119766 A1 | 6/2005 | Amundson et al. | |
| 2005/0119771 A1 | 6/2005 | Amundson et al. | |
| 2005/0119793 A1 | 6/2005 | Amundson et al. | |
| 2005/0119794 A1 | 6/2005 | Amundson et al. | |
| 2005/0149233 A1 | 7/2005 | Metz | |
| 2005/0183773 A1 | 8/2005 | Sinclaire | |
| 2006/0177306 A1 | 8/2006 | Parker et al. | |
| 2006/0231246 A1 | 10/2006 | Roskewich | |
| 2007/0084939 A1 | 4/2007 | Liu | |
| 2009/0032236 A1 | 2/2009 | Geadelmann et al. | |

OTHER PUBLICATIONS

"HVAC Control Systems." University of Texas Civil, Architectural, and Environmental Engineering. N.p., May 2, 2006. Web. Jun. 30, 2016.
http://www.thisisbroken.com/b/2005/07/chancery_court_.html, "This is Broken—Hotel Thermometer," 8 pages, printed May 24, 2007.
City of Berkeley CECO (Commercial Energy Conservation Ordinance), 12 pages, prior to Aug. 3, 2007.
Guestat, Digital Thermostat, Installation Instructions, 35 pages, Oct. 2003.
Line Voltage Premier Series, Installation and Operating Instructions, 8 pages, Dec. 13, 2006.
Peco, "T168 Proportional Thermostat, Smart Energy Management," 2 pages, 2008.
PECO, T155 Auto/Manual Changeover Thermostat, 2 pages, 2005.
PECO, T170 Commercial Thermostat, 2 pages, 2005.
PECO, T170 Commercial Thermostat, Continuous or Cycling Fan, 1 page, 2005.
PECO, T170 Hospitality Thermostat, Application Guide, 1 page, Jan. 19, 2006.
PECO, T170 Thermostat, 24 VAC/120-277 VAC On/Off Control, 2 pages, 2005.
PECO, T170/S200 Application Guide, 2 pages, prior to Aug. 3, 2007.
PECO, TA155 Thermostat, Manual Changeover, 1 page, 2005.
SST-1 Heating and Cooling with Automatic Changeover, Operating Instructions, 2 pages, prior to Aug. 3, 2007.
XCI Corporation, "Application Note: Hotel/Motel Energy Management," 3 pages, 1997-1998.
Commercial Programmable Thermostat T7350, Product Data; Honeywell International Inc. Cited in U.S. Pat. No. 5,851,621, dated Feb. 8, 2005.
Honeywell, "T7350 Commercial Programmable Thermostat for Single-or MTG5127ULTI-STAGE Conventional Heat Pump Systems," Product Data, 40 pages, Jul. 2007.

* cited by examiner

FAN COIL THERMOSTAT WITH FAN RAMPING

This application is a continuation of co-pending U.S. patent application Ser. No. 14/740,789, filed Jun. 16, 2015, entitled "Fan Coil Thermostat with Fan Ramping", which is a continuation of U.S. patent application Ser. No. 11/833,703, filed Aug. 3, 2007, entitled "Fan Coil Thermostat with Fan Ramping", now U.S. Pat. No. 9,074,784, issued Jul. 7, 2015, both of which are incorporated herein by reference.

TECHNICAL FIELD

The present disclosure pertains generally to thermostats and more particularly to thermostats adapted for use with fan coils.

BACKGROUND

A variety of buildings such as hotels, apartment buildings and the like are heated and cooled using fan coil systems. In a fan coil system, a heat transfer fluid such as water is pumped or otherwise forced through a fan coil. A fan is used to blow air across the fan coil. If the heat transfer fluid was heated, heated air will blow out of the fan coil system. Conversely, if the heat transfer fluid was cooled, cool air will blow out of the fan coil system.

Like other HVAC systems, fan coil systems often consume significant amounts of energy. A significant amount of energy may be saved, for example, by operating fan coil systems more efficiently.

SUMMARY

The present disclosure pertains to fan coil thermostats that can provide energy savings and or increased comfort by, for example, operating a fan coil system more efficiently.

In an illustrative but non-limiting example, a fan coil thermostat is configured for use with a fan coil system. In some cases, the fan coil system includes a fan coil that is configured for fluid communication with a source of heated fluid and/or a source of cooled fluid, a valve that controls fluid flow through the fan coil, and a fan that blows air across the fan coil.

The fan coil thermostat may include a user interface that is adapted to permit a user to enter a temperature set point. The fan coil thermostat may include or be in communication with a temperature sensor that is adapted to measure a current ambient temperature. The fan coil thermostat may include a controller that is adapted to implement a control algorithm for controlling the fan coil system. In some cases, the control algorithm calculates an error value relating to a temperature difference between the current sensed temperature and the current temperature set point. To operate the fan coil system more efficiently and/or with increased comfort, the control algorithm may use both a proportional term and an integral term related to the error value to regulate the fan speed of the fan coil system.

The above summary is not intended to describe each disclosed embodiment or every implementation of the present invention. The Figures and Detailed Description that follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
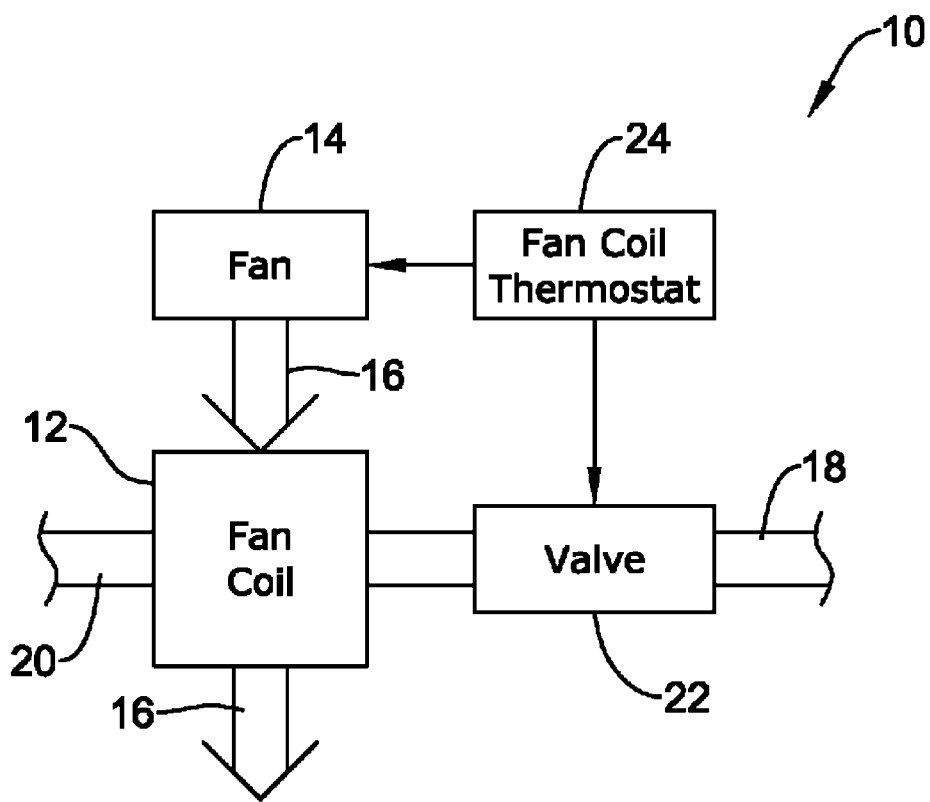
FIG. 1 is a schematic view of an illustrative but non-limiting fan coil system.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

FIG. 1 is a schematic view of an illustrative but non-limiting fan coil system 10. While the illustrative fan coil system 10 is schematically shown as a two-pipe fan coil system including a single supply line and a single return line, it will be appreciated that fan coil system 10 may instead be a four-pipe fan coil system having heated water supply and return lines as well as cooled water supply and return lines. In some cases, a four-pipe system may include a single fan coil while in other cases, a four-pipe system may include two fan coils, with one dedicated to heated and one dedicated to cooling. In a two-pipe fan coil system, the single supply line may, for example, provide heated water during the heating season and may provide cooled water during the cooling season.

The illustrative fan coil system 10 includes a fan coil 12. Fan coil 12 is a heat exchanger through which heated or cooled fluid flows. A fan 14 blows air across fan coil 12 as schematically shown by arrows 16. In some cases, fan 14 pulls ambient air from within the space and/or from outside the building. The ambient air is then heated or cooled by the fan coil 12 and provided into the space. In some cases, fan coil system 10 may be disposed within a housing (not shown) having a first vent or opening upstream of fan 14 and a second vent or opening downstream of fan coil 12. Fan 14 may pull air through the first vent or opening and then exhaust the heated or cooled air through the second vent or opening and into the space. The components may be arranged either horizontally or vertically within such a housing, as desired or perhaps as dictated by space considerations.

In order to accommodate fluid flow through fan coil 12, fan coil system 10 includes a supply line 18 and a return line 20. During the heating season, supply line 18 provides a source of heated fluid (such as water) from a suitable source such as a boiler or water heater, geothermal and/or the like. During the cooling season, supply line 18 provides a source of cooled fluid (such as water) from a suitable source such as an evaporative cooling tower or the like.

A valve 22 is disposed within supply line 18, upstream of fan coil 12, in order to control fluid flow through fan coil 12. In some cases, valve 22 may provide binary, i.e., on/off control while in other cases it is contemplated that valve 22 may be configured to provide a plurality of flow rates into fan coil 12.

Figure 2:
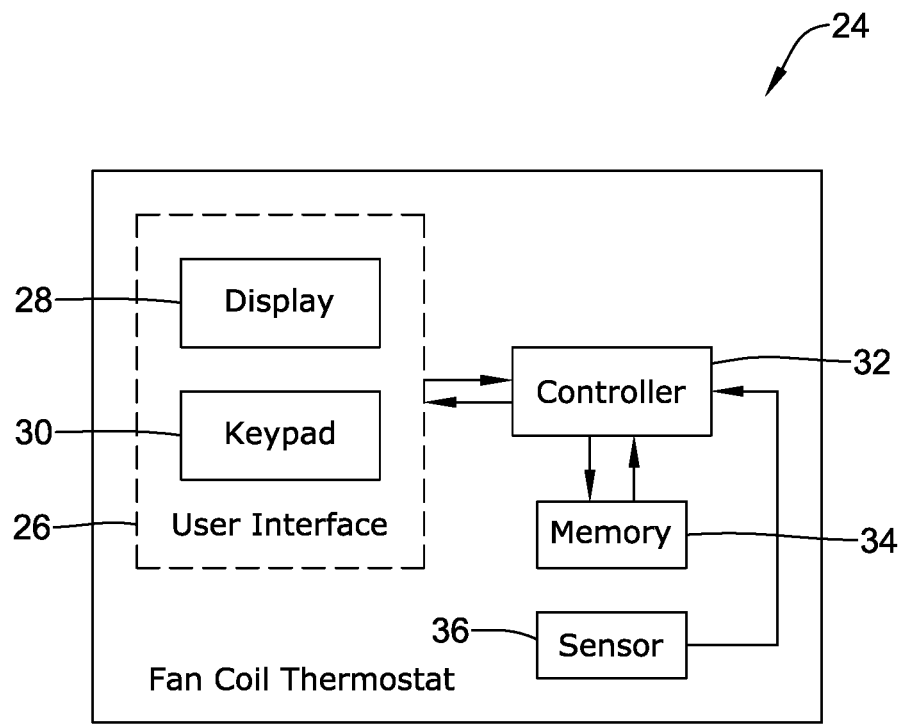
FIG. 2 is a schematic view of an illustrative but non-limiting fan coil thermostat as may be used in the fan coil system of FIG. 1.

Fan coil system 10 may include a fan coil thermostat 24 that controls operation of valve 22 and/or operation of fan 14 in order to achieve a desired temperature level within a space that is conditioned by fan coil system 10. Fan coil thermostat 24 is better described with respect to FIG. 2. FIG. 2 schematically shows various components of an illustrative fan coil thermostat 24. The illustrative fan coil thermostat 24 includes a user interface 26 that may include a display 28 and a keypad 30. Display 28 may be any suitable alphanumeric display medium that is capable of displaying visually discernible information. In some cases, display 28 may be a liquid crystal display (LCD), but this is not required. Keypad 30 may include one or more individual electromechanical buttons such as such as an on/off button, a temperature up button, a temperature down button, a fan speed up button, a fan speed down button, and the like. In some cases, it is contemplated that user interface 26 may be a touch screen LCD that encompasses the function of display 28 as well as keypad 30. That is, the buttons of keypad 30 may include, for example, electromechanical buttons, soft buttons, and/or touch regions on a touch screen display, as desired.

The illustrative fan coil thermostat 24 may include a controller 32. In some cases, controller 32 may implement a control algorithm that is adapted to at least partially control one or more components of fan coil system 10. In some instances, the control algorithm may control and/or regulate operation of fan 14 (FIG. 1).

In some cases, the control algorithm may determine fan speed based at least in part on if valve 22 (FIG. 1) is open or closed and/or how far valve 22 is open. In some instances, the control algorithm may dictate that fan 14 (FIG. 1) is off if valve 22 is closed. As valve 22 opens, the control algorithm may dictate that fan 14 is running at, for example, a low speed, a medium speed, a high speed or the like. In some cases, the control algorithm may determine a fan speed also based at least in part on a temperature differential between a current sensed temperature and a current temperature set point, and/or a current sensed humidity and a current humidity set point.

Controller 32 may be adapted to provide information to and/or receive information from user interface 26. Controller 32 may, for example, display a current temperature and/or a current temperature set point on display 28. Other examples of information that may be provided by controller 32 include a current fan speed, current fan mode, equipment status (on/off), current time, and the like. Examples of information that may be received from keypad 30 may include changes in a temperature set point, changes in fan speed and the like.

In some cases, the illustrative fan coil thermostat 24 may include a memory block 34. Memory block 34 may be used, for example, to store one or more unoccupied temperature set points, a current temperature set point, and/or programming that instructs controller 32 how to regulate valve 22 (FIG. 1) and/or fan 14 (FIG. 1) in order to obtain and maintain a particular temperature set point. Memory block 34 may store, for example, the aforementioned control algorithm.

In some instances, fan coil thermostat 24 may include a sensor 36 that provides controller 32 with information pertaining to current conditions within a space conditioned by fan coil system 10 (FIG. 1). Sensor 36 may be a temperature sensor, a humidity sensor and/or any other suitable sensor, as desired. In some cases, sensor 36 may be located internally to fan coil thermostat 24, although in some instances, sensor 36 may instead be located remotely from fan coil thermostat 24.

Figure 3:
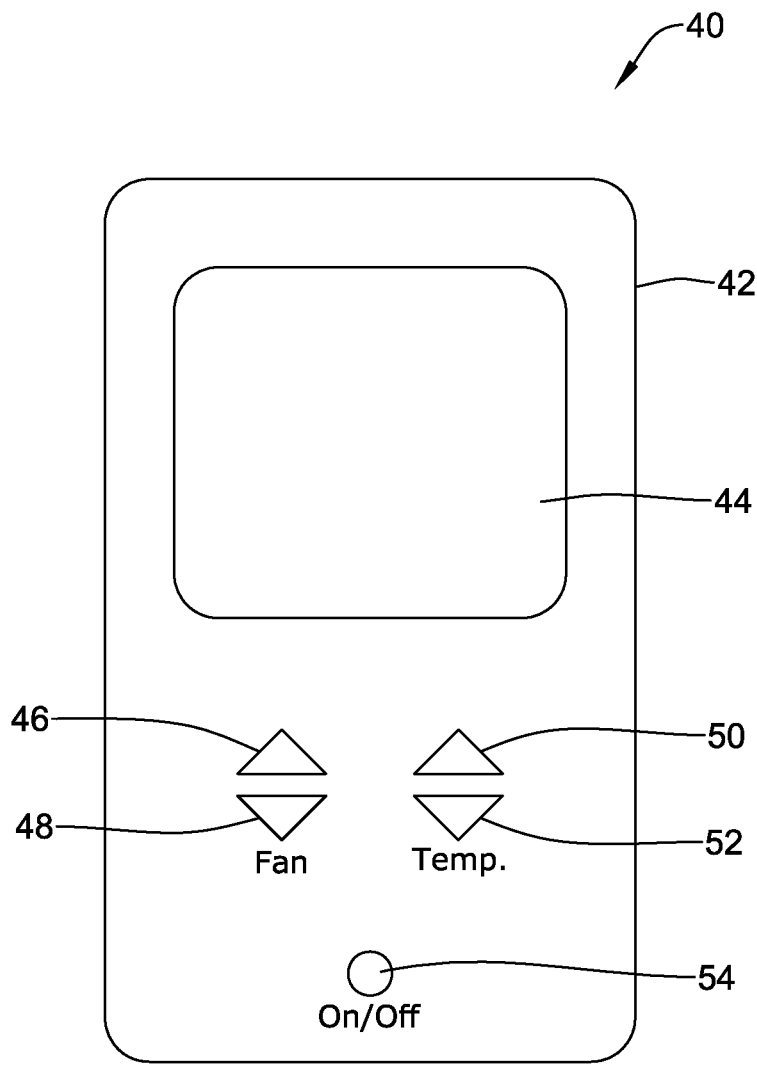
FIG. 3 is a front view of an illustrative embodiment of the fan coil thermostat of FIG. 2.

FIG. 3 is a front view of an illustrative fan coil thermostat 40. Fan coil thermostat 40 may be considered as an embodiment or perhaps as a particular example of fan coil thermostat 24 (FIG. 2). The illustrative fan coil thermostat 40 includes a housing 42 that may be formed of any suitable material such as molded plastic. The illustrative fan coil thermostat 40 also includes a display 44 that may be any suitable display such as an LCD display.

The illustrative fan coil thermostat 40 also includes several buttons that may be considered as examples of keypad 30 (FIG. 2). The buttons illustrated are not to be considered as limiting in any way, but are merely provided to show examples of buttons that may be included. As illustrated, fan coil thermostat 40 includes a fan speed up button 46 and a fan speed down button 48. In some cases, it is contemplated that fan coil thermostat 40 may include a single fan speed button (not shown) that can be pressed repeatedly to step through the available fan speed settings. In some instances, a slider button or even a rotary dial may be provided to select a fan speed setting.

As illustrated, fan coil thermostat 40 includes a temperature up button 50 and a temperature down button 52. A user may select and/or alter a temperature setting by pressing temperature up button 50 and/or temperature down button 52, as appropriate. A power button 54 may also be provided. It is contemplated that fan coil thermostat 40 may instead have a touch screen LCD that provides the functionality of display 44 as well as fan speed up button 46, fan speed down button 48, temperature up button 50, temperature down button 52, and power button 54. In some cases, the various buttons may be provided as touch regions on the touch screen display.

Figure 4:
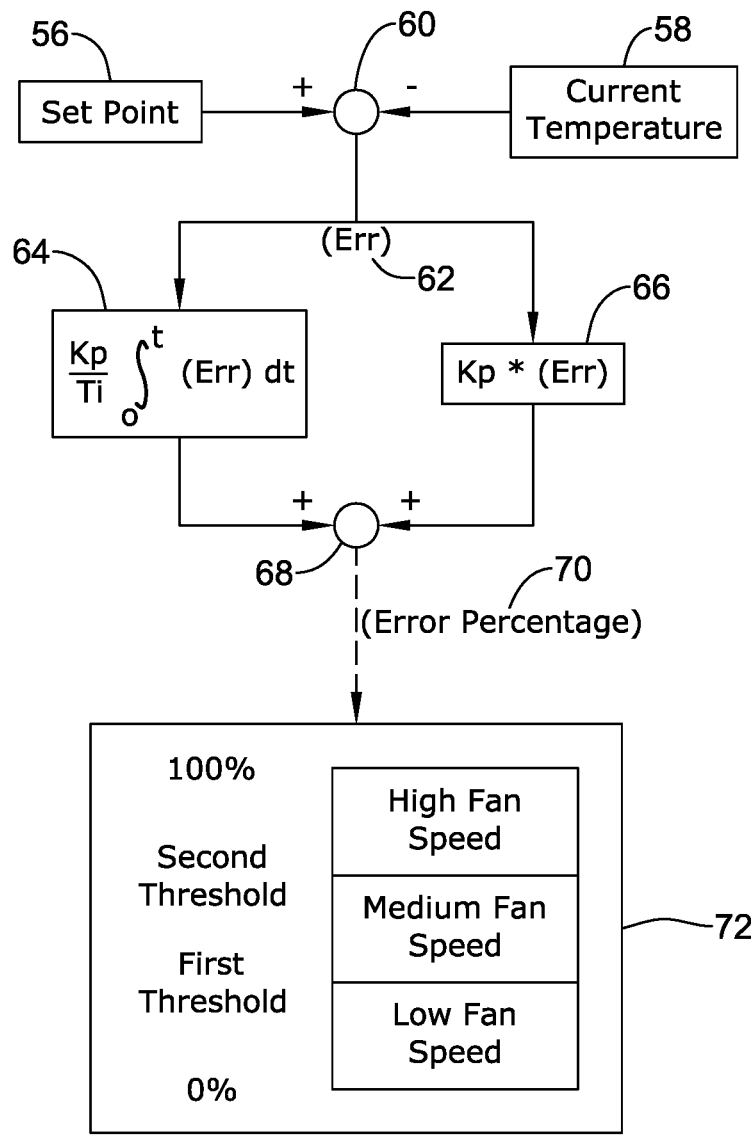
FIG. 4 is a block diagram showing an illustrative control algorithm that may be employed within the fan coil system of FIG. 1.

FIG. 4 is a block diagram of an illustrative control algorithm for controlling the fan speed of the fan coil thermostat 24. In general terms, the illustrative control algorithm compares the current temperature set point to the current temperature reading provided by temperature sensor 36 (FIG. 2), and then calculates therefrom an error percentage 70. The error percentage 70 is calculated using both a proportional term 66 and an integral term 64, as shown. The resulting error percentage 70 is then used to select a suitable fan speed for operating fan 14 (FIG. 1), as will be discussed subsequently.

For the purposes of this discussion, the error percentage 70 may be considered as representative of a temperature difference between a temperature set point and a current temperature reading relative to a throttling range (or gain). The throttling range is a parameter that may be set when programming controller 32 and may be considered as representing a temperature difference at which controller 32 would instruct fan coil system 10 (FIG. 1) to operate at maximum output.

To illustrate, assume for a moment that the throttling range has been set equal to 5° F. If a temperature difference is 5° F., the error percentage would be 100%. If the temperature difference is 2° F., the error percentage would be 40%. It will be recognized that the throttling range is a parameter that depends at least in part upon system particulars and system performance parameters and thus the numerical examples provided herein are merely illustrative and should not be construed or interpreted as limiting in any manner. One of skill in the art will recognize that the block diagram provided in FIG. 4 illustrates an inventive application of P-I (proportional-integral) control to a fan coil thermostat, thereby providing improved fan control and thus improved energy efficiency, consumer comfort and the like.

Referring specifically to FIG. 4, and at block 56, controller 32 (FIG. 2) receives a signal from user interface 26 (FIG. 1) and/or from memory 34 (FIG. 2) that represents a current temperature set point. Block 58 represents controller 32 receiving a signal representing a current temperature reading from, for example, sensor 36 (FIG. 2). The signal from block 56 and the signal from block 58 are summed (or subtracted) at summation point 60 to provide a signal representing an error indicated as (Err) 62.

Signal (Err) 62 is provided to block 64 as well as to block 66. At block 64, controller 32 (FIG. 2) effectively integrates the (Err) signal 62. In the given equation, $K_p$ is the gain (or 100%/throttling range) and Ti is an integral time constant. At block 66, controller 32 also calculates a proportional contribution, using a gain of $K_p$. The resultant values are summed at summation block 68 to provide the error percentage 70.

The error percentage 70 enters a fan speed driver 72, which in some cases may be considered as manifested within the programming of controller 32. In some cases, controller 32 may not instruct fan 14 to operate at all, if for example valve 22 (FIG. 1) is closed, regardless of whether error percentage 70 would otherwise indicate a non-zero fan speed. As can be seen, if error percentage 70 is between 0 and a first threshold, controller 32 may instruct fan 14 (FIG. 1) to operate at a low fan speed.

If error percentage 70 is above the first threshold but below a second threshold, controller 32 may instruct fan 14 to operate at a medium fan speed. If error percentage 70 is above the second threshold, controller 32 may instruct fan 14 to operate at a high fan speed.

While FIG. 4 pertains to a fan 14 (FIG. 1) that has a low fan speed, a medium fan speed and a high speed, it will be recognized that in some cases, fan 14 may have more than three distinct speeds, or may in some cases have fewer than three distinct speeds. In some instances, fan 14 may have an infinite number of fan speeds. In any event, fan speed driver 72 may be adjusted or altered to compensate for a different number of speeds.

In some cases, error percentage 70 may be exactly or almost exactly equal (within the precision of controller 32) to either the first threshold or the second threshold. In some cases, the low fan speed may apply if error percentage 70 is less than or equal to the first threshold while in other cases, the low fan speed may apply only if error percentage 70 is less than the first threshold. Similarly, the medium fan speed may apply if error percentage 70 is less than or equal to the second threshold, while in some cases the medium fan speed may only apply if error percentage 70 is less than the second threshold. In other words, whether a particular threshold is regarded as "equal to or less than" or only "less than" is merely a programming matter. Moreover, it is contemplated that fan speed driver 72 may provide a degree of hysteresis when switching between low, medium and high fan speeds. For example, and in some cases, when switching between the low fan speed and the medium fan speed, the error percentage 70 may need to exceed the first threshold by a certain amount, and when switching between the medium fan speed and the low fan speed, the error percentage 70 may need to drop below the first threshold by a certain amount. The same may be applied when switching between the medium fan speed and the high fan speed. Such hysteresis may help reduce short term switching of the fan speed when the error percentage 70 is at or near the first and/or second thresholds.

The first threshold and the second threshold may be set equal to any desired value. In an illustrative but non-limiting example, the first threshold may be set equal to about 40% and the second threshold may be set equal to about 80%. It will be appreciated that other values may be used, and thus the control algorithm may be fine-tuned for a particular application.

Figure 5:
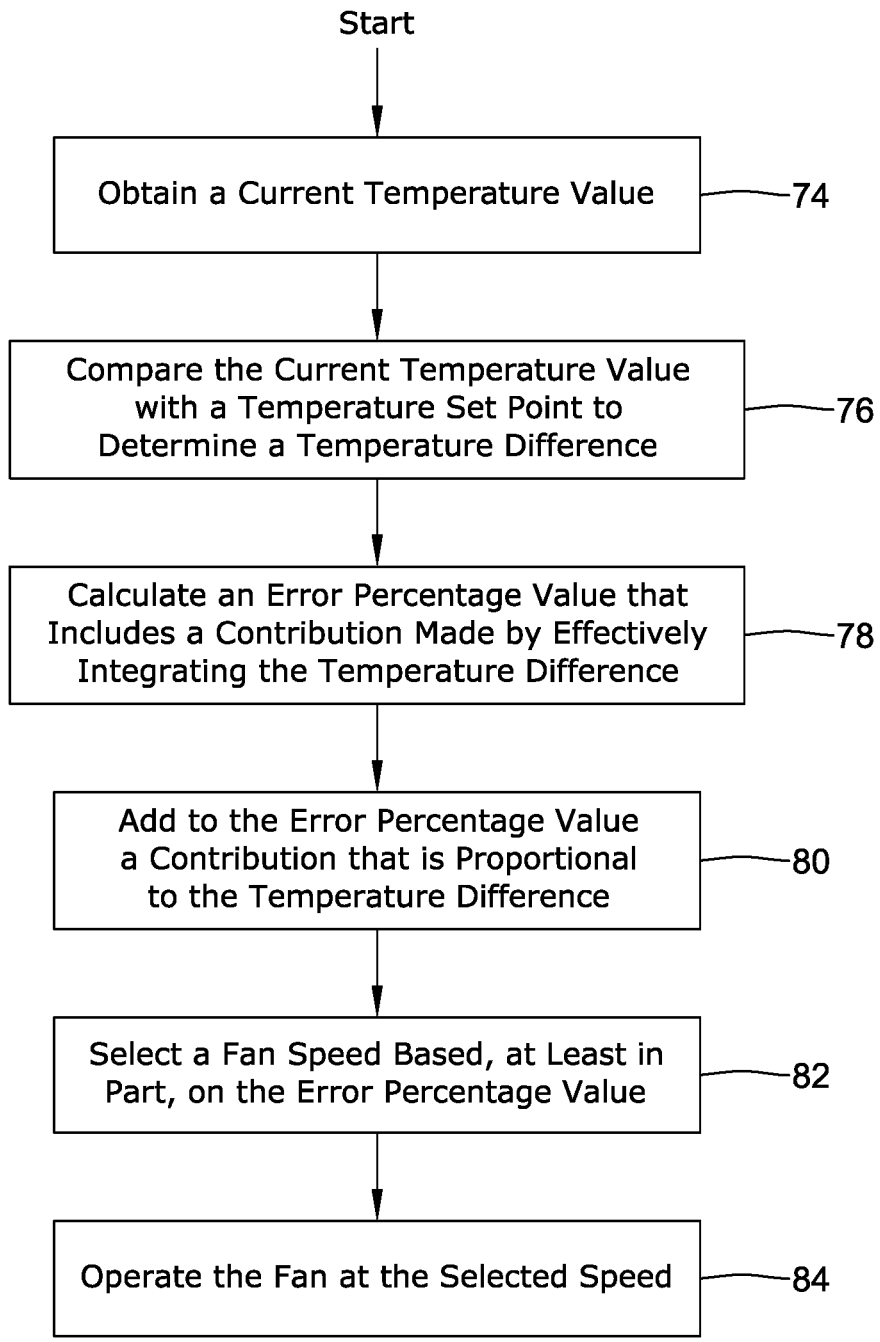
FIG. 5 is a flow diagram showing an illustrative method that may be carried out using the fan coil system of FIG. 1.

FIG. 5 shows an illustrative method that may be carried out using fan coil system 10 (FIG. 1). At block 74, controller 32 (FIG. 2) obtains a current temperature value from sensor 36 (FIG. 2). Control passes to block 76, where controller 32 compares the current temperature value with a temperature set point that may be received from user interface 26 (FIG. 2) and/or from memory block 34 (FIG. 2) to determine a temperature difference. At block 78, an error percentage is calculated. The error percentage includes a contribution that is made by integrating the temperature difference. In some cases, as seen at block 80, there may also be a contribution that is proportional to the temperature difference.

Control passes to block 82, where controller 32 (FIG. 2) selects a fan speed based on the error percentage value. In some cases, a low fan speed may be selected if the error percentage value is below a first threshold. A medium fan speed may be selected if the error percentage value is above the first threshold but below a second threshold. A high fan speed may be selected if the error percentage value is above the second threshold. At block 84, controller 32 operates fan 14 (FIG. 1) in accordance with the selected fan speed.

Figure 6:
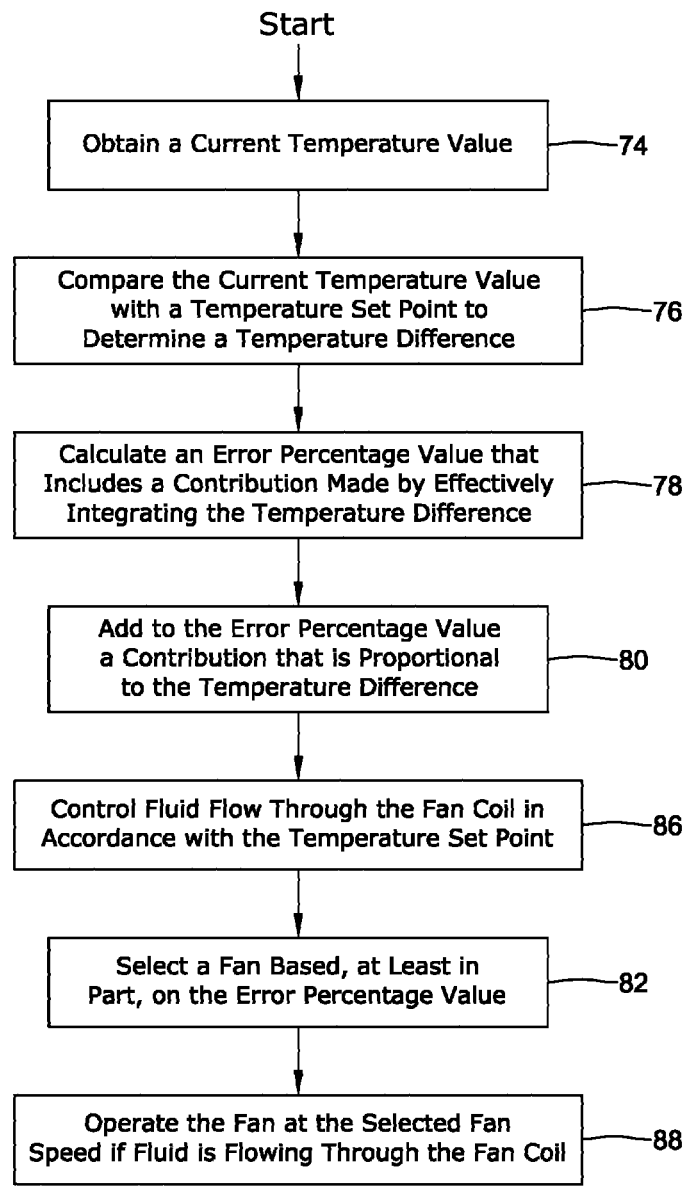
FIG. 6 is a flow diagram showing an illustrative method that may be carried out using the fan coil system of FIG. 1.

FIG. 6 shows an illustrative method that may be carried out using fan coil system 10 (FIG. 1). At block 74, controller 32 (FIG. 2) obtains a current temperature value from sensor 36 (FIG. 2) and compares it to a temperature set point (at block 76) to determine a temperature difference. At block 78, an error percentage is calculated. The error percentage includes a contribution that is made by integrating the temperature difference. In some cases, as seen at block 80, there may also be a contribution that is proportional to the temperature difference.

Control passes to block 86, where controller 32 (FIG. 2) controls fluid flow through fan coil 12 (FIG. 1) by opening and/or closing valve 22 (FIG. 1) in accordance with the temperature set point. At block 82, controller 32 (FIG. 2) selects a fan speed based on the error percentage value. In some cases, a low fan speed may be selected if the error percentage value is below a first threshold. A medium fan speed may be selected if the error percentage value is above the first threshold but below a second threshold. A high fan speed may be selected if the error percentage value is above the second threshold. At block 88, controller 32 operates fan 14 (FIG. 1) in accordance with the selected fan speed if fluid is flowing through fan coil (12). In some cases, if no fluid is flowing through fan coil (12), fan (14) will not operate, regardless of the error percentage value.

While the present disclosure has been described with respect to illustrative fan coil systems that include one or more pipes carrying heated water for heating and/or cooled water for cooling, it should be noted that the inventive concepts described herein are not limited to such systems. Some systems may be hybrid-type systems, with an A/C compressor for cooling and heated water for heating. Some systems may be through-the-wall systems, having one or more of a compressor for air conditioning, an electric or gas heating element for heating, and a heat pump. Fan coil thermostat 40 may, for example, be used with these systems as well as the systems described herein.

The present disclosure should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A method of operating a fan coil system comprising a fan coil and a fan adapted to blow air across the fan coil, the fan having a plurality of fan speeds, the method comprising:
   displaying a temperature set point on a user interface, the temperature set point being adjustable via the user interface;
   obtaining a current temperature value from a temperature sensor;
   determining a temperature difference between the current temperature value and the temperature set point;
   storing a maximum temperature difference, a first threshold for the temperature difference that is less than the maximum temperature difference and a second threshold that is greater than the first threshold and less than the maximum temperature difference;
   establishing a fan throttle range based on the maximum temperature difference;
   operating the fan at a low fan speed within the fan throttle range when the temperature difference is below the first threshold;
   operating the fan at a medium fan speed within the fan throttle range when the temperature difference is between the first threshold and the second threshold; and
   operating the fan at a high fan speed within the fan throttle range when the temperature difference is above the second threshold.

2. The method of claim 1, further comprising:
   implementing hysteresis when switching between the low fan speed and the medium fan speed.

3. The method of claim 1, further comprising:
   implementing hysteresis when switching between the medium fan speed and the high fan speed.

4. The method of claim 1, where the fan speed is controlled by a controller that is programmed with a proportional-integral (PI) control algorithm.

5. The method of claim 4, wherein the PI control algorithm comprises a proportional term including the temperature difference ($T_{ERR}$) and a gain constant (Kp), and further comprising an integral term including the temperature difference ($T_{ERR}$), a time constant (Ti) and the gain constant (Kp).

6. The method of claim 5, wherein the proportional term is of the form Kp*$T_{ERR}$, and the integral term is of the form:

$$\frac{K_P}{T_i} \int_0^\tau T_{ERR} dt.$$

7. The method of claim 1, where the fan throttle range is established such that the fan operates at a maximum speed when the temperature difference approaches the maximum temperature difference.

8. The method of claim 1, where the fan throttle range is established such that when the temperature difference is less than 100% of the maximum temperature difference, the fan is operated at a corresponding percentage of a maximum fan speed.

9. The method of claim 1, wherein the fan coil accommodates fluid flow therethrough.

10. A fan coil thermostat for use with a fan coil system having a fan coil and a fan adapted to blow air across the fan coil, comprising:
    a housing;
    a user interface disposed in the housing and accessible from outside of the housing, the user interface including at least one button for allowing a user to enter a temperature set point;
    a temperature sensor configured to measure a current temperature;
    a controller disposed within the housing, the controller configured to:
        calculate a control error based on a temperature difference between the current temperature and the temperature set point, the control error confined to a control error range extending from no temperature difference to a predefined maximum temperature difference;
        correlate the control error range to a fan throttle range that extends from a low fan speed to a medium fan speed to a high fan speed; and
        select a fan speed based on the control error and the correlation between the control error range and the fan throttle range; and
        output one or more fan speed control signals suitable for setting the fan speed of the fan coil system to the selected fan speed.

11. The fan coil thermostat of claim 10, the control error comprising a proportional term including the temperature difference and an integral term including the temperature difference.

12. The fan coil thermostat of claim 10, where the controller is configured to implement a proportional-integral (PI) control algorithm.

13. The fan coil thermostat of claim 12, wherein the PI control algorithm comprises a proportional term including the temperature difference ($T_{ERR}$) and a gain constant (Kp), and further comprises an integral term including the temperature difference ($T_{ERR}$), a time constant (Ti) and the gain constant (Kp).

14. The fan coil thermostat of claim 13, wherein the proportional term is of the form Kp*$T_{ERR}$, and the integral term is of the form:

$$\frac{K_P}{T_i} \int_0^\tau T_{ERR} dt.$$

15. The fan coil thermostat of claim 10, where the fan operates at a maximum speed when the temperature difference approaches the predefined maximum temperature difference.

16. The fan coil thermostat of claim 10, where the controller is configured to implement hysteresis when switching between the low fan speed and the medium fan speed.

17. The fan coil thermostat of claim 10, where the controller is configured to implement hysteresis when switching between the medium fan speed and the high fan speed.

18. The fan coil thermostat of claim 10, where the controller is configured to store the predefined maximum temperature difference, a first threshold for the temperature difference that is less than the predefined maximum temperature difference and a second threshold that is greater than the first threshold and less than the predefined maximum temperature difference.

19. The fan coil thermostat of claim 18, where the controller is configured to operate the fan at a low fan speed within the fan throttle range when the temperature difference is below the first threshold, operate the fan at a medium fan speed within the fan throttle range when the temperature difference is between the first threshold and the second threshold, and operate the fan at the high fan speed within the fan throttle range when the temperature difference is above the second threshold.

20. A method of operating a fan coil system comprising a fan coil and a fan adapted to blow air across the fan coil, the fan having a fan speed range, the method comprising:

obtaining a current temperature value from a temperature sensor;

storing a maximum temperature difference;

determining a current control error, the current control error representing a difference between the current temperature value and a temperature set point over a control error range that is bounded by no temperature difference on one end and the maximum temperature difference on the other end, and wherein the current control error is set to the maximum temperature difference if the difference between the current temperature value and the temperature set point is greater than the maximum temperature difference for an extended period of time; and selecting a fan speed within the fan speed range based at least in part on the current control error.

* * * * *